US008681855B2

(12) United States Patent
Yin et al.

(10) Patent No.: US 8,681,855 B2
(45) Date of Patent: Mar. 25, 2014

(54) METHOD AND APPARATUS FOR VIDEO ENCODING AND DECODING GEOMETRICALLY PARTITIONED BI-PREDICTIVE MODE PARTITIONS

(75) Inventors: Peng Yin, Ithaca, NY (US); Oscar Divorra Escoda, Barcelona (ES)

(73) Assignee: Thomson Licensing, Boulogne-Billancourt (FR)

( * ) Notice: Subject to any disclaimer, the term of this patent is extended or adjusted under 35 U.S.C. 154(b) by 570 days.

(21) Appl. No.: 12/734,076

(22) PCT Filed: Oct. 10, 2008

(86) PCT No.: PCT/US2008/011661
§ 371 (c)(1),
(2), (4) Date: Apr. 9, 2010

(87) PCT Pub. No.: WO2009/051668
PCT Pub. Date: Apr. 23, 2009

(65) Prior Publication Data
US 2010/0208818 A1     Aug. 19, 2010

Related U.S. Application Data

(60) Provisional application No. 60/979,586, filed on Oct. 12, 2007.

(51) Int. Cl.
*H04N 7/26* (2006.01)
*H04N 7/12* (2006.01)
(52) U.S. Cl.
USPC .................................. 375/240; 375/E7.027
(58) Field of Classification Search
None
See application file for complete search history.

(56) References Cited

U.S. PATENT DOCUMENTS

| 6,654,420 | B1 * | 11/2003 | Snook | 375/240.16 |
| 7,233,621 | B2 * | 6/2007 | Jeon | 375/240.15 |
| 8,085,845 | B2 * | 12/2011 | Tourapis et al. | 375/240.16 |
| 8,155,191 | B2 * | 4/2012 | Lu et al. | 375/240.15 |
| 2003/0152147 | A1 * | 8/2003 | Akimoto et al. | 375/240.19 |

(Continued)

FOREIGN PATENT DOCUMENTS

| JP | 2005-277968 A2 | 10/2005 |
| WO | WO2006052577 | 5/2006 |
| WO | WO2008016605 | 2/2008 |

OTHER PUBLICATIONS

Kondo et al, "A Motion Compression Technique Using Sliced Blocks in Hybrid Video Coding", IEEE Int'l. Conf. on Image Processing (ICIP 2005), Sep. 11-14, 2005.*

(Continued)

*Primary Examiner* — Jayanti K Patel
*Assistant Examiner* — Reza Aghevli
(74) *Attorney, Agent, or Firm* — Vincent E. Duffy; Gregory S. Weaver

(57) ABSTRACT

There are provided methods and apparatus for video encoding and decoding geometrically partitioned bi-predictive mode partitions. An apparatus includes an encoder for encoding bi-predictable picture data for at least a portion of a picture using adaptive geometric partitioning. Geometric partitions for the adaptive geometric partitioning are predicted using at least one predictor selected from a first set of predictors corresponding to a first list of references pictures, a second set of predictors corresponding to a second list of references pictures, and a third set of predictors used for bi-prediction and including predictors from at least one of the first and second sets.

25 Claims, 7 Drawing Sheets

(56) References Cited

U.S. PATENT DOCUMENTS

| | | | |
|---|---|---|---|
| 2003/0202602 A1* | 10/2003 | Apostolopoulos et al. | 375/240.24 |
| 2006/0153297 A1* | 7/2006 | Boyce | 375/240.16 |
| 2007/0009044 A1* | 1/2007 | Tourapis et al. | 375/240.25 |
| 2007/0019731 A1* | 1/2007 | Huang | 375/240.15 |
| 2007/0047648 A1* | 3/2007 | Tourapis et al. | 375/240.13 |
| 2009/0067505 A1* | 3/2009 | Tourapis et al. | 375/240.16 |
| 2012/0177106 A1* | 7/2012 | Divorra Escoda et al. | 375/240.03 |

OTHER PUBLICATIONS

Hung et al, "On Macroblock Partition for Motion Compensation", IEEE Int'l. Conf. on Image Processing (ICIP 2006), Oct. 8-11, 2006.*

Divorra Escoda et al, "Geometry-Adaptive Block Partitioning for Video Coding", Int'l. Conf. on Acoustics, Speech and Processing, vol. 1, Jan. 1, 2007.*

Dai et al, "Geometry-Adaptive Block Partitioning for Intra Prediction in Image and Video Coding", IEEE Int'l. Conf. on Image Processing (ICIP 2007), vol. VI, Sep. 16 to Oct. 19, 2007, pp. 85-88.*

Escoda et al.:"Geometry-Adaptive Block Partitioning for Video Coding," International Conference on Acoustics, Speech, and Signal Processing, vol. 1, Jan. 1, 2007, pp. I-657.

Divorra et al.:"Geometry-Adaptive Block Partioning," Joint Video Team ISO/MPEG & ITU_T/SG16 VCEG, No. VCEG-AF10, Apr. 19, 2007.

Hung et al.:"On Macroblock Partition for Motion Compensation," Image Processing, 2006 IEEE International Conference on, IEEE, PI, Oct. 1, 2006, pp. 1697-1700.

Kondo et al.:"A Motion Compensation Technique Using Sliced Blocks and Its Application to Hybrid Video Coding," Visual Communication and Image Processing, Jul. 12, 2005.

Dai et al.:"Geometry-Adaptive Block Partitioning for Intra Prediction in Image & Video Coding," Image Processing, 2007, ICIP 2007, IEEE International Conference on, Sep. 1, 2007, pp. Vi-85.

Divorra et al.:"Hierarchical B-Frame Results on Geometry Adaptive Block Partitioning," Video Coding Experts Group of TU-T SG.,16, No. VCEG-AH16, Jan. 11, 2008.

International Telecommunication Union.:"Advanced Video Coding for Generic Audiovisual Services," ITU-T H.264, Mar. 2005, I-325.

Wiegand et al, "Draft Errata List with Revision-Marked Corrections for H.264/AVC", Joint Video Team (JVT) of ISO/IEC MPEG & ITU-T VCEG (ISO/IEC JTC1/SC29/WG11 and ITU-T SG16 Q.6) 9th Meeting: San Diego, California, Document: JTV-1050, ITU-T, Sep. 2003, p. 71-73, 175-178.

* cited by examiner

METHOD AND APPARATUS FOR VIDEO ENCODING AND DECODING GEOMETRICALLY PARTITIONED BI-PREDICTIVE MODE PARTITIONS

CROSS-REFERENCE TO RELATED APPLICATIONS

This application claims the benefit, under 35 U.S.C. §365 of International Application PCT/US2008/011661, filed Oct. 10, 2008 which was published in accordance with PCT Article 21(2) on Apr. 23, 2009 in English and which claims the benefit of United States provisional patent application No. 60/979,586 filed Oct. 12, 2007.

TECHNICAL FIELD

The present principles relate generally to video encoding and decoding and, more particularly, to methods and apparatus for video encoding and decoding geometrically partitioned bi-predictive mode partitions.

BACKGROUND

Tree-structured macroblock partitioning is adopted in current major video coding standards. The International Telecommunication Union, Telecommunication Sector (ITU-T) H.261 Recommendation (hereinafter the "H.261 Recommendation"), the International Organization for Standardization/International Electrotechnical Commission (ISO/IEC) Moving Picture Experts Group-1 Standard (hereinafter the "MPEG-1 Standard), and the ISO/IEC Moving Picture Experts Group-2 Standard/ITU-T H.263 Recommendation (hereinafter the "MPEG-2 Standard") support only 16×16 macroblock (MB) partitions. The ISO/IEC Moving Picture Experts Group-4 Part 2 simple profile or ITU-T H.263(+) Recommendation support both 16×16 and 8×8 partitions for a 16×16 macroblock. The MPEG-4 AVC Standard supports tree-structured hierarchical macroblock partitions. A 16×16 macroblock can be partitioned into macroblock partitions of sizes 16×8, 8×16, or 8×8. 8×8 partitions are also known as sub-macroblocks. Sub-macroblocks can be further broken into sub-macroblock partitions of sizes 8×4, 4×8, and 4×4.

Depending on whether predictive (P) Frames or bi-predictive (B) Frames are encoded, different prediction configurations are possible using the tree-based partitions. These prediction configurations define the available coding modes in the MPEG-4 AVC Standard coder and/or decoder. P frames allow for temporal prediction from a first list of reference frames, while B frames allow the use of up to two lists of reference frames, for backward/forward/bi-predictional prediction in block partitions. More generally, we will not specify any direction. Instead, P frames predict from LIST 0, B frames allow prediction from LIST 0, LIST 1 or LIST 0 and LIST 1. For simplicity, in the following text, we will simply refer to forward prediction for LIST 0 prediction, backward prediction for LIST 1 prediction, and bi-prediction for both LIST 0 and LIST 1 prediction. For instance, examples of these coding modes for P and B frames include the following:

*P*-frame:

$$MODE \in \begin{Bmatrix} INTRA4 \times 4, INTRA16 \times 16, INTRA8 \times 8, SKIP, \\ INTER16 \times 16, INTER16 \times 8, INTER8 \times 16, \\ INTER8 \times 8, INTER8 \times 4, \\ INTER4 \times 8, INTER4 \times 4 \end{Bmatrix},$$

*B*-frame:

$$MODE \in \begin{Bmatrix} INTRA4 \times 4, INTRA16 \times 16, \\ INTRA8 \times 8, BIDIRECT, DIRECT, \\ FWD16 \times 16, BKW16 \times 16, BI16 \times 16 \\ FWD - FWD16 \times 8, FWD - BKW16 \times 8, \\ BKW - FWD16 \times 8, BKW - BKW16 \times 8 \\ FWD - BI16 \times 8, BI - FWD16 \times 8, \\ BKW - BI16 \times 8, BI - BKW16 \times 8, BI - BI16 \times 8 \\ FWD - FWD8 \times 16, FWD - BKW8 \times 16, \\ BKW - FWD16 \times 8, BKW - BKW16 \times 8 \\ FWD - BI16 \times 8, BI - FWD16 \times 8, \\ BKW - BI16 \times 8, BI - BKW16 \times 8, BI - BI16 \times 8 \\ 8 \times 8, etc \ldots \end{Bmatrix},$$

where "FWD" indicates prediction from the forward prediction list or list 0, "BKW" indicates prediction from the backward prediction list or list 1, "BI" indicates bi-prediction from both the forward and backward lists, "FWD-FWD indicates two predictions each from the forward prediction list, and "FWD-BKW" indicates a first prediction from the forward prediction list and a second prediction from the backward prediction list.

The frame partition in the MPEG-4 AVC Standard is more efficient than the simple uniform block partition typically used in older video coding standards such as MPEG-2. However, tree based frame partitioning is not without deficiency, as it is inefficient in some coding scenarios due to its inability to capture the geometric structure of two-dimensional (2D) data. In order to solve such limitations, a prior art method (hereinafter "prior art method") was introduced to better represent and code two-dimensional video data by taking its two-dimensional geometry into account. The prior art method utilizes wedge partitions (i.e., partition of a block into two regions that are separated by an arbitrary line or curve) in a new set of modes for both inter (INTER16×16GEO, INTER8×8GEO) and intra prediction (INTRA16×16GEO, INTRA8×8GEO).

In one implementation of the prior art method, the MPEG-4 AVC Standard is used as a basis to incorporate the geometric partition mode. Geometric partitions within blocks are modeled by the implicit formulation of a line. Turning to FIG. 1, an exemplary geometric partitioning of an image block is indicated generally by the reference numeral 100. The overall image block is indicated generally by the reference numeral 120, and the two partitions of the image block 120, locating on opposing sides of diagonal line 150, are respectively indicated generally by the reference numerals 130 and 140.

Hence, partitions are defined as follows:

$$f(x,y) = x \cos \theta + y \sin \theta - \rho,$$

where $\rho$, $\theta$ respectively denote the following: the distance from the origin to the boundary line f(x,y) in the orthogonal direction to f(x,y); and the angle of the orthogonal direction to f(x,y) with the horizontal coordinate axis x.

It directly follows from its formulation that more involved models for f(x,y) with higher order geometric parameters are also considered.

Each block pixel (x,y) is classified such that:

$$\text{GEO\_Partition} = \begin{cases} \text{if } f(x,y) > 0 & \text{Partition 0} \\ \text{if } f(x,y) = 0 & \text{Line Boundary} \\ \text{if } f(x,y) < 0 & \text{Partition 1} \end{cases}$$

For coding purposes, a dictionary of possible partitions (or geometric modes) is a priori defined. This can be formally defined such that:

$$\rho : \rho \in \left[0, \frac{\sqrt{2}\, MB_{Size}}{2}\right) \text{ and } \rho \subset \{0, \Delta\rho, 2\cdot\Delta\rho, 3\cdot\Delta\rho, ...\},$$

and $$\theta : \begin{cases} \text{if } \rho = 0 & \theta \in [0, 180) \\ \text{else} & \theta \in [0, 360) \end{cases} \text{ and } \theta \subset \{0, \Delta\theta, 2\cdot\Delta\theta, 3\cdot\Delta\theta, ...\},$$

where $\Delta\rho$ and $\Delta\theta$ are the selected quantization (parameter resolution) steps. The quantized indices for $\theta$ and $\rho$ are the information transmitted to code the edge. However, if modes 16×8 and 8×16 are used in the coding procedure, angles 0 and 90, for the case of $\rho=0$, can be removed from the set of possible edges.

Within the prior art method, for a geometry-adaptive motion compensation mode, a search on $\theta$ and $\rho$, and motion vectors for each partition is performed in order to find the best configuration. A full search strategy is done in two stages, for every $\theta$ and $\rho$ pair, where the best motion vectors are searched. Within the geometry-adaptive intra prediction mode, a search on $\theta$ and $\rho$ and the best predictor (directional prediction or statistics, and so forth) for each partition is performed in order to find the best configuration.

Turning to FIG. 2, an exemplary INTER-P image block partitioned with a geometry adaptive straight line is indicated generally by the reference numeral 200. The overall image block is indicated generally by the reference numeral 220, and the two partitions of the image block 220 are respectively indicated generally by the reference numerals 230 and 240.

The prediction compensation of the block can be stated as follows for P modes:

$$\hat{I} = \hat{I}_{t'}(\vec{x} - MV_1) \cdot \text{MASK}_{P0}(x,y) + \hat{I}_{t''}(\vec{x} - MV_2) \cdot \text{MASK}_{P1}(x,y),$$

where $\hat{I}_t$ represents the current prediction and $\hat{I}_{t'}(\vec{x}-MV_2)$ and $\hat{I}_{t''}(\vec{x}-MV_1)$ are the block motion compensated references for partitions P2 and P1, respectively. Each $\text{MASK}_P(x,y)$ includes the contribution weight for each pixel (x,y) for each of the partitions. Pixels that are not on the partition boundary generally do not need any operation. In practice, the mask value is either 1 or 0. Only those pixels near the partition border may need to combine the prediction values from both references.

Thus, while inter prediction using geometry adaptive block partitioning has been identified as a promising research direction on improving coding efficiency, current implementations of the same have been limited to INTER-P frames.

SUMMARY

These and other drawbacks and disadvantages of the prior art are addressed by the present principles, which are directed to methods and apparatus for video encoding and decoding geometrically partitioned bi-predictive mode partitions.

According to an aspect of the present principles, there is provided an apparatus. The apparatus includes an encoder for encoding bi-predictable picture data for at least a portion of a picture using adaptive geometric partitioning. Geometric partitions for the adaptive geometric partitioning are predicted using at least one predictor selected from a first set of predictors corresponding to a first list of references pictures, a second set of predictors corresponding to a second list of references pictures, and a third set of predictors used for bi-prediction and including predictors from at least one of the first and second sets.

According to another aspect of the present principles, there is provided a method. The method includes encoding bi-predictable picture data for at least a portion of a picture using adaptive geometric partitioning. Geometric partitions for the adaptive geometric partitioning are predicted using at least one predictor selected from a first set of predictors corresponding to a first list of references pictures, a second set of predictors corresponding to a second list of references pictures, and a third set of predictors used for bi-prediction and including predictors from at least one of the first and second sets.

According to yet another aspect of the present principles, there is provided an apparatus. The apparatus includes a decoder for decoding bi-predictable picture data for at least a portion of a picture using adaptive geometric partitioning. Geometric partitions for the adaptive geometric partitioning are predicted using at least one predictor selected from a first set of predictors corresponding to a first list of references pictures, a second set of predictors corresponding to a second list of references pictures, and a third set of predictors used for bi-prediction and including predictors from at least one of the first and second sets.

According to still another aspect of the present principles, there is provided a method. The method includes decoding bi-predictable picture data for at least a portion of a picture using adaptive geometric partitioning. Geometric partitions for the adaptive geometric partitioning are predicted using at least one predictor selected from a first set of predictors corresponding to a first list of references pictures, a second set of predictors corresponding to a second list of references pictures, and a third set of predictors used for bi-prediction and including predictors from at least one of the first and second sets.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

Figure 1:
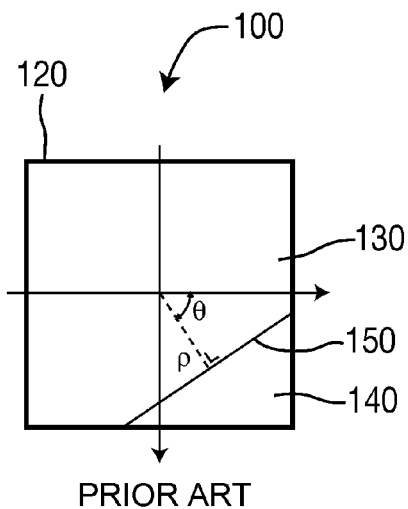
FIG. 1 is a diagram for an exemplary geometric partitioning of an image block.
Figure 2:
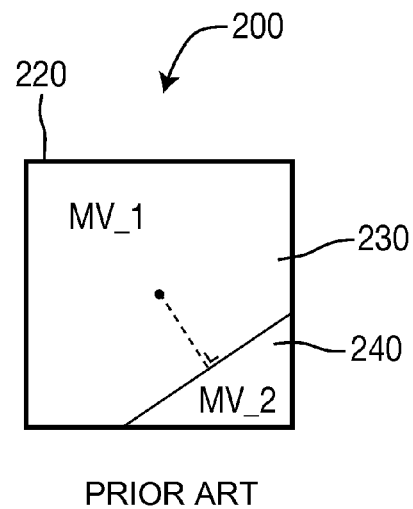
FIG. 2 is a diagram for an exemplary INTER-P image block partitioned with a geometry adaptive straight line.

The present principles are directed to methods and apparatus for video encoding and decoding geometrically partitioned bi-predictive mode partitions.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles means that a particular feature, structure, characteristic, and so forth described in connection with the embodiment is included in at least one embodiment of the present principles. Thus, the appearances of the phrase "in one embodiment" or "in an embodiment" appearing in various places throughout the specification are not necessarily all referring to the same embodiment.

It is to be appreciated that the use of the terms "and/or" and "at least one of", for example, in the cases of "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Moreover, it is to be appreciated that while one or more embodiments of the present principles are described herein with respect to the MPEG-4 AVC standard, the present principles are not limited to solely this standard and, thus, may be utilized with respect to other video coding standards, recommendations, and extensions thereof, including extensions of the MPEG-4 AVC standard, while maintaining the spirit of the present principles.

Figure 3:
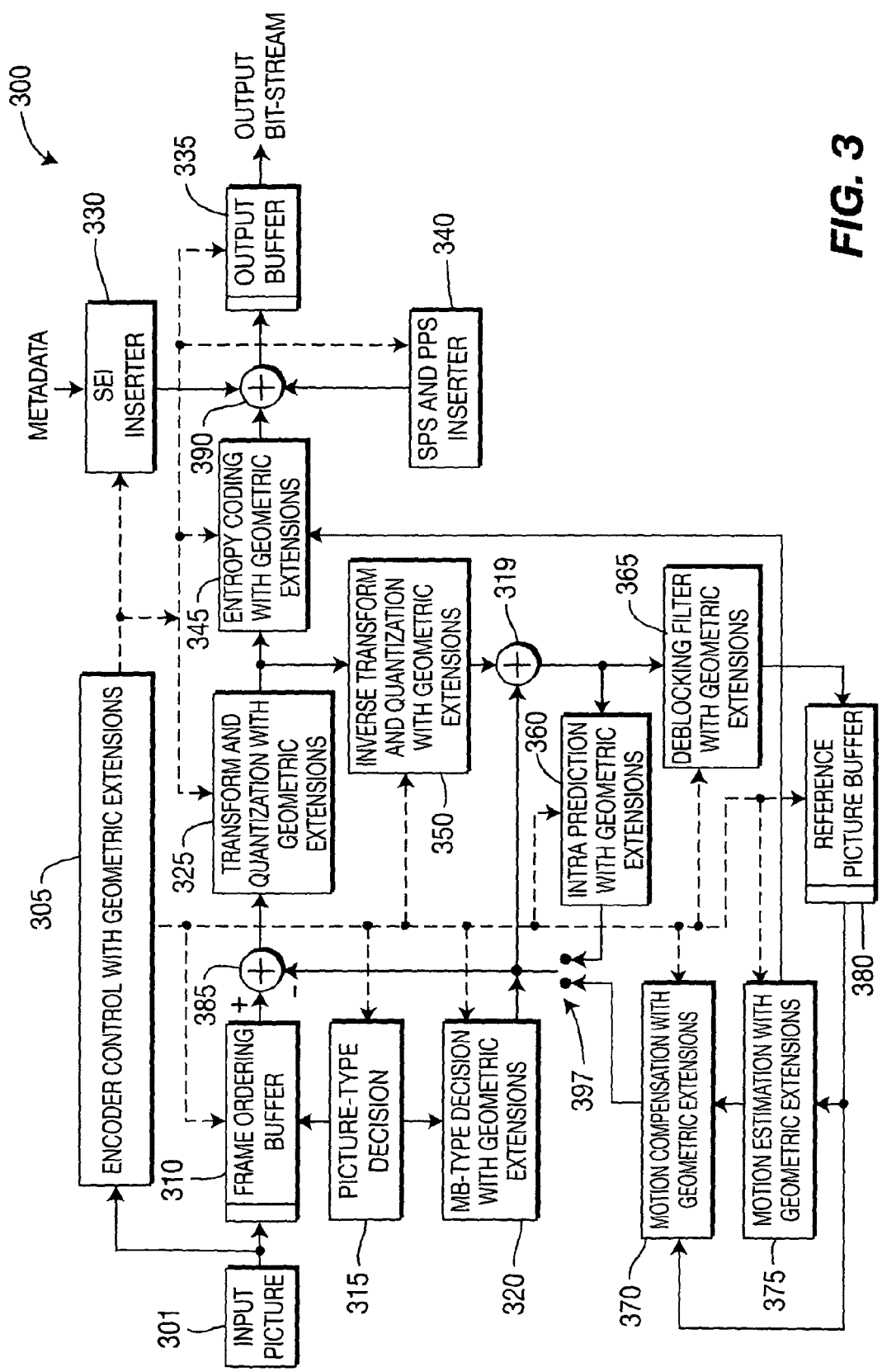
FIG. 3 is a block diagram for an exemplary encoder to which the present principles may be applied, in accordance with an embodiment of the present principles.

Turning to FIG. 3, a video encoder capable of performing video encoding in accordance with the MPEG-4 AVC standard is indicated generally by the reference numeral 300.

The video encoder 300 includes a frame ordering buffer 310 having an output in signal communication with a non-inverting input of a combiner 385. An output of the combiner 385 is connected in signal communication with a first input of a transformer and quantizer with geometric extensions 325. An output of the transformer and quantizer with geometric extensions 325 is connected in signal communication with a first input of an entropy coder with geometric extensions 345 and a first input of an inverse transformer and inverse quantizer with geometric extensions 350. An output of the entropy coder with geometric extensions 345 is connected in signal communication with a first non-inverting input of a combiner 390. An output of the combiner 390 is connected in signal communication with a first input of an output buffer 335.

A first output of an encoder controller with geometric extensions 305 is connected in signal communication with a second input of the frame ordering buffer 310, a second input of the inverse transformer and inverse quantizer with geometric extensions 350, an input of a picture-type decision module 315, an input of a macroblock-type (MB-type) decision module with geometric extensions 320, a second input of an intra prediction module with geometric extensions 360, a second input of a deblocking filter with geometric extensions with geometric extensions 365, a first input of a motion compensator with geometric extensions 370, a first input of a motion estimator with geometric extensions 375, and a second input of a reference picture buffer 380.

A second output of the encoder controller with geometric extensions 305 is connected in signal communication with a first input of a Supplemental Enhancement Information (SEI) inserter 330, a second input of the transformer and quantizer with geometric extensions 325, a second input of the entropy coder with geometric extensions 345, a second input of the output buffer 335, and an input of the Sequence Parameter Set (SPS) and Picture Parameter Set (PPS) inserter 340.

A first output of the picture-type decision module 315 is connected in signal communication with a third input of a frame ordering buffer 310. A second output of the picture-type decision module 315 is connected in signal communication with a second input of a macroblock-type decision module with geometric extensions 320.

An output of the Sequence Parameter Set (SPS) and Picture Parameter Set (PPS) inserter 340 is connected in signal communication with a third non-inverting input of the combiner 390.

An output of the inverse quantizer and inverse transformer with geometric extensions 350 is connected in signal communication with a first non-inverting input of a combiner 319. An output of the combiner 319 is connected in signal communication with a first input of the intra prediction module with geometric extensions 360 and a first input of the deblocking filter with geometric extensions 365. An output of the deblocking filter with geometric extensions 365 is connected in signal communication with a first input of a reference picture buffer 380. An output of the reference picture buffer 380 is connected in signal communication with a second input of the motion estimator with geometric extensions 375. A first output of the motion estimator with geometric extensions 375 is connected in signal communication with a second input of the motion compensator with geometric extensions 370. A second output of the motion estimator with geometric extensions 375 is connected in signal communication with a third input of the entropy coder with geometric extensions 345.

An output of the motion compensator with geometric extensions 370 is connected in signal communication with a first input of a switch 397. An output of the intra prediction module with geometric extensions 360 is connected in signal communication with a second input of the switch 397. An output of the macroblock-type decision module with geometric extensions 320 is connected in signal communication with a third input of the switch 397. The third input of the switch 397 determines whether or not the "data" input of the switch (as compared to the control input, i.e., the third input) is to be provided by the motion compensator with geometric extensions 370 or the intra prediction module with geometric extensions 360. The output of the switch 397 is connected in signal communication with a second non-inverting input of the combiner 319 and with an inverting input of the combiner 385.

Inputs of the frame ordering buffer 310 and the encoder controller with geometric extensions 305 are available as input of the encoder 100, for receiving an input picture 301. Moreover, an input of the Supplemental Enhancement Information (SEI) inserter 330 is available as an input of the encoder 300, for receiving metadata. An output of the output buffer 335 is available as an output of the encoder 300, for outputting a bitstream.

Figure 4:
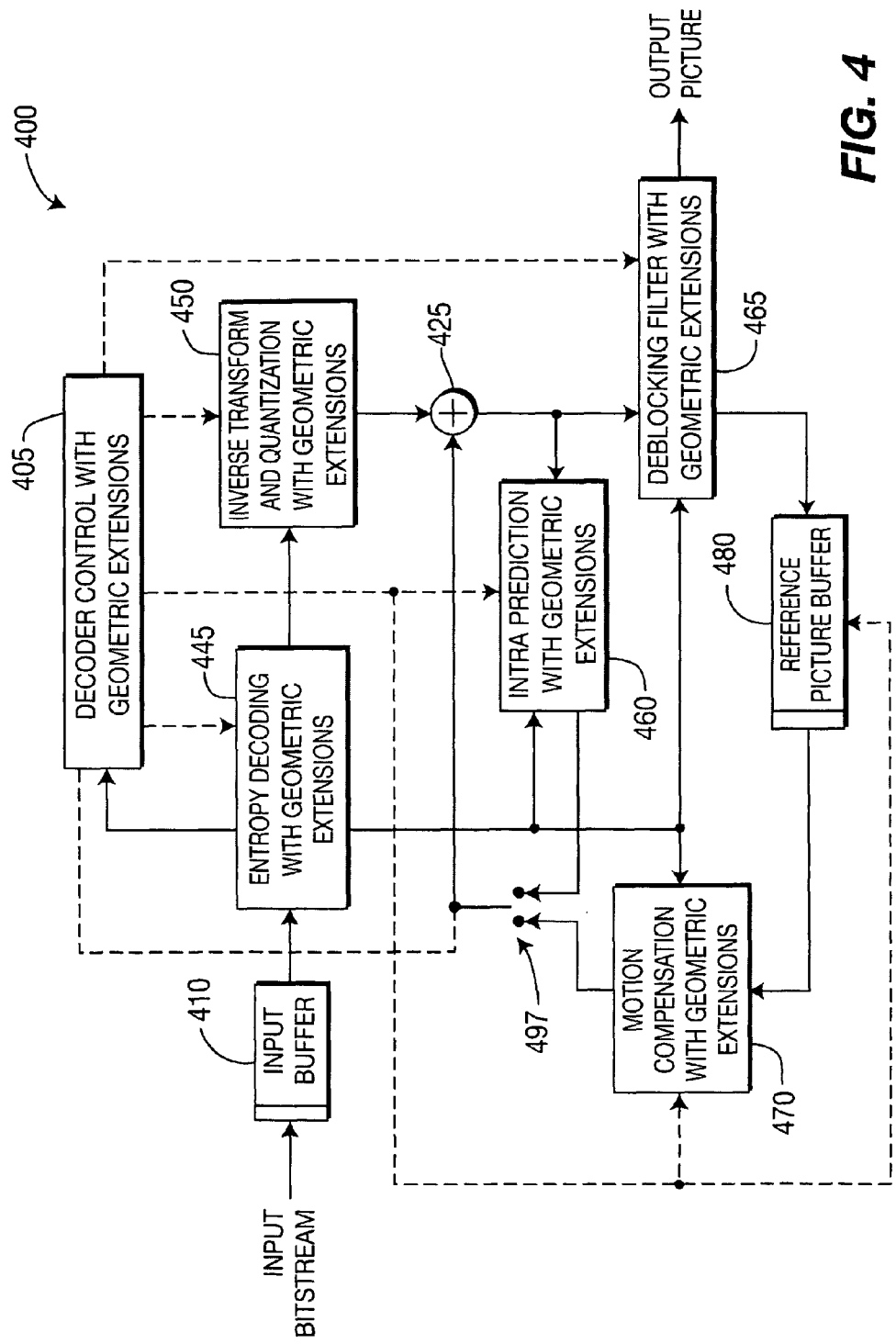
FIG. 4 is a block diagram for an exemplary decoder to which the present principles may be applied, in accordance with an embodiment of the present principles.

Turning to FIG. 4, a video decoder capable of performing video decoding in accordance with the MPEG-4 AVC standard is indicated generally by the reference numeral 400.

The video decoder 400 includes an input buffer 410 having an output connected in signal communication with a first input of the entropy decoder with geometric extensions 445. A first output of the entropy decoder with geometric extensions 445 is connected in signal communication with a first input of an inverse transformer and inverse quantizer with geometric extensions 450. An output of the inverse transformer and inverse quantizer with geometric extensions 450 is connected in signal communication with a second non-inverting input of a combiner 425. An output of the combiner 425 is connected in signal communication with a second input of a deblocking filter with geometric extensions 465 and a first input of an intra prediction module with geometric extensions 460. A second output of the deblocking filter with geometric extensions 465 is connected in signal communication with a first input of a reference picture buffer 480. An output of the reference picture buffer 480 is connected in signal communication with a second input of a motion compensator with geometric extensions 470.

A second output of the entropy decoder with geometric extensions 445 is connected in signal communication with a third input of the motion compensator with geometric extensions 470 and a first input of the deblocking filter with geometric extensions 465. A third output of the entropy decoder with geometric extensions 445 is connected in signal communication with an input of a decoder controller with region merging extensions 405. A first output of the decoder controller with geometric extensions 405 is connected in signal communication with a second input of the entropy decoder with geometric extensions 445. A second output of the decoder controller with geometric extensions 405 is connected in signal communication with a second input of the inverse transformer and inverse quantizer with geometric extensions 450. A third output of the decoder controller with geometric extensions 405 is connected in signal communication with a third input of the deblocking filter with geometric extensions 465. A fourth output of the decoder controller with geometric extensions 405 is connected in signal communication with a second input of the intra prediction module with geometric extensions 460, with a first input of the motion compensator with geometric extensions 470, and with a second input of the reference picture buffer 480. A fifth output of the decoder controller with geometric extensions 405 is connected in signal communication with a control portion of an output of a switch 497, for controlling whether the output of the switch 497 is connected to a first input of the switch 497 or a second input of the switch 497.

An output of the motion compensator with geometric extensions 470 is connected in signal communication with the first input of a switch 497. An output of the intra prediction module with geometric extensions 460 is connected in signal communication with the second input of the switch 497. The output of the switch 497 is connected in signal communication with a first non-inverting input of the combiner 425.

An input of the input buffer 410 is available as an input of the decoder 400, for receiving an input bitstream. A first output of the deblocking filter with geometric extensions 465 is available as an output of the decoder 400, for outputting an output picture.

As noted above, the present principles are directed to methods and apparatus for video encoding and decoding geometrically partitioned bi-predictive mode partitions.

It is to be appreciated that efficient encoding of prediction modes requires an accurate design of the way and manner in which information is structured and transmitted to the decoder. Thus, depending on how data is arranged for the transmission to the decoder and the particular entropic coding used, the gains and benefits in compression efficiency introduced by some particular coding modes at the prediction level may be lost by spending an unnecessary excessive amount of bits.

In accordance with one or more embodiments of the present principles, solutions to the preceding problem are proposed with respect to efficient coding schemes for B-Frames where geometry-adaptive block partitions are used.

As noted above, although one or more embodiments of the present principles are directed to and/or otherwise described with respect to the MPEG-4 AVC Standard (that is, incorporating the geometric mode partition into the MPEG-4 AVC Standard), it is to be appreciated that the present principles are not limited to solely this Standard and may be readily applied to other standards, recommendations, and/or extensions thereof, while maintaining the spirit of the present principles.

In the case of motion predicted pictures, larger blocks are used in picture areas where pixels can share the same type of prediction information while smaller size blocks tend to cumulate on motion boundaries between regions with different texture. Sometimes, near motion boundaries, such a tree based partition separately codes similar data in different sub-blocks, leading to an unnecessary overhead. Also, blocks overlapping both motion regions may carry some prediction error due to the difficulty in accurately predicting pixels on both boundary sides.

Even if bi-prediction modes currently used in the MPEG-4 AVC Standard help reduce the prediction error and improve the representation of some picture details, they still only partially exploit the underlying structure of two-dimensional visual data, leaving room for improvement.

In accordance with one or more embodiments of the present principles, we disclose and describe a scheme which uses geometry-adapted block partitions in the framework of bi-prediction (i.e., B-Frames). The use of geometry adapted-partitions within the B-Frames framework can help to better model motion boundaries while profiting from the benefits of bi-prediction for reducing occlusion effects and quantization noise. Indeed, in an embodiment, one can use at least one of a forward prediction, a backward prediction and a bi-prediction in at least one of the partitions generated in a block by geometry-adaptive partitions.

Figure 5:
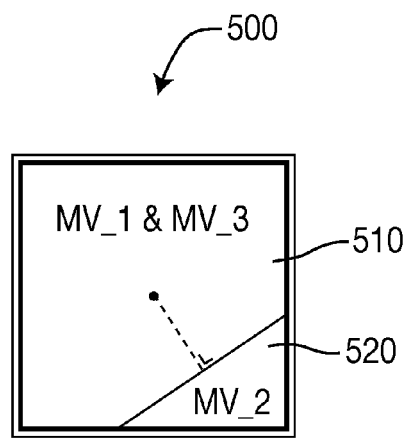
FIG. 5 is a diagram for an exemplary INTER-B block partitioned with a geometry adaptive straight line, in accordance with an embodiment of the present principles.

Turning to FIG. 5, an exemplary INTER-B block partitioned with a geometry adaptive straight line is represented generally by the reference numeral 500. The region 510 with motion vectors MV_1 & MV_3 is bi-predicted while the region 520 with motion vector MV_2 is predicted from one single reference frame. As used herein, MV_x refers to three-dimensional (3D) motion vectors (i.e., spatial displacement plus the reference frame).

In an embodiment, according to FIG. 5, the prediction compensation of the block can be stated as follows:

$$\hat{I}_t = ((\hat{I}_{t'''}(\vec{x}-MV_3)+\hat{I}_{t'}(\vec{x}-MV_1))/2) \cdot \text{MASK}_{P0}(x,y) + \hat{I}_{t''}(\vec{x}-MV_2) \cdot \text{MASK}_{P1}(x,y)$$

In an embodiment, the block partitioning is a generalization of 16×8, 8×16, 8×4 and 4×8 B-Frame block modes, and an improvement, respectively, upon B-Frames 8×8 and 4×4. As such, new B-Frame modes INTER16×16GEO and INTER8×8GEO are inserted in the modes table. In the framework of B-Frames, additional data is signaled in order to indicate the prediction type of each geometry-adapted partition (e.g., forward, backward, and bi-prediction). For this purpose, all possible reference list combination modes for backward, forward and bi-predictional prediction are considered for the B-Frame GEO proposed modes. That is, for Partition 0 and Partition 1: Forward-Forward, Forward-Backward, Backward-Forward, Backward-Backward, Backward-Bi-prediction, Bi-prediction-Backward, Forward-Bi-prediction, Bi-prediction-Forward, Bi-prediction-Bi-prediction. B-Frames INTER8×8GEO uses the same type of prediction (backward, forward or Bi-predictional) for both partitions.

In accordance with an embodiment of the present principles, geometry adapted block partitioning for B-Frames can also be adapted to support weighted bi-prediction within the defined partitions.

Considering all the possible combinations on prediction direction plus block partitioning, one can define a series of B-Frame macroblock modes where frame partition is combined with prediction description for geometry-adaptive modes. Together with the already existing list of modes in the MPEG-4 AVC Standard, the whole set of B-Frame prediction modes generates a very large family of modes. This can be seen in TABLE 2 and TABLE 4, and can be compared to the original tables of the MPEG-4 AVC Standard (namely TABLE 1 and TABLE 3 herein).

In particular, TABLE 1 shows B-frame macroblock coding modes for the MPEG-4 AVC Standard, while TABLE 2 shows exemplary B frame macroblock coding modes for the MPEG-4 AVC Standard with geometry-adaptive partitioned blocks. Further, TABLE 3 shows B-frame sub8×8 coding modes for the MPEG-4 AVC Standard, while TABLE 4 shows exemplary B frame sub8×8 coding modes for the MPEG-4 AVC Standard with geometry-adaptive partitioned blocks.

TABLE 1

| Slice Type | Mb_type | Mb_type |
|---|---|---|
| B_slice | 0 Direct | 12 16 × 8_L0Bi |
| | 1 16 × 16_L0 | 13 8 × 16_L0Bi |
| | 2 16 × 16_L1 | 14 16 × 8_L1Bi |
| | 3 16 × 16_Bi | 15 8 × 16_L1Bi |
| | 4 16 × 8_L0L0 | 16 16 × 8_BiL0 |
| | 5 8 × 16_L0L0 | 17 8 × 16_BiL0 |
| | 6 16 × 8_L1L1 | 18 16 × 8_BiL1 |
| | 7 8 × 16_L1L1 | 19 8 × 16_BiL1 |
| | 8 16 × 8_L0L1 | 20 16 × 8_BiBi |
| | 9 8 × 16_L0L1 | 21 8 × 16_BiBi |
| | 10 16 × 8_L1L0 | 22 8 × 8 Prefix |
| | 11 8 × 16_L1L0 | 23 Intra (4 × 4 or 16 × 16) |

TABLE 2

| Slice Type | Mb_type | Mb_type |
|---|---|---|
| B_slice | 0 Direct | 16 16 × 8_L0Bi |
| | 1 16 × 16_L0 | 17 8 × 16_L0Bi |
| | 2 16 × 16_L1 | 18 16 × 16_GEO_L0Bi |
| | 3 16 × 16_Bi | 19 16 × 8_L1Bi |
| | 4 16 × 8_L0L0 | 20 8 × 16_L1Bi |
| | 5 8 × 16_L0L0 | 21 16 × 16_GEO_L1Bi |
| | 6 16 × 16_GEO_L0L0 | 22 16 × 8_BiL0 |
| | 7 16 × 8_L1L1 | 23 8 × 16_BiL0 |
| | 8 8 × 16_L1L1 | 24 16 × 16_GEO_BiL0 |
| | 9 16 × 16_GEO_L1L1 | 25 16 × 8_BiL1 |
| | 10 16 × 8_L0L1 | 26 8 × 16_BiL1 |
| | 11 8 × 16_L0L1 | 27 16 × 16_GEO_BiL1 |
| | 12 16 × 16_GEO_L0L1 | 28 16 × 8_BiBi |
| | 13 16 × 8_L1L0 | 29 8 × 16_BiBi |
| | 14 8 × 16_L1L0 | 30 16 × 16_GEO_BiBi |
| | 15 16 × 16_GEO_L1L0 | 31 8 × 8 Prefix |
| | | 32 Intra (4 × 4 or 16 × 16) |

TABLE 3

| Slice Type | Blk_type |
|---|---|
| B_slice | 8 × 8_Direct |
| | 8 × 8_L0 |
| | 8 × 8_L1 |
| | 8 × 8_Bi |
| | 8 × 4_L0 |
| | 4 × 8_L0 |
| | 8 × 4_L1 |
| | 4 × 8_L1 |
| | 8 × 4_Bi |
| | 4 × 8_Bi |
| | 4 × 4_L0 |
| | 4 × 4_L1 |
| | 4 × 4_Bi |

TABLE 4

| Slice Type | Blk_type |
|---|---|
| B_slice | 8 × 8_Direct |
| | 8 × 8_L0 |
| | 8 × 8_L1 |
| | 8 × 8_Bi |
| | 8 × 4_L0 |
| | 4 × 8_L0 |
| | 8 × 8_GEO_L0 |
| | 8 × 4_L1 |
| | 4 × 8_L1 |
| | 8 × 8_GEO_L1 |
| | 8 × 4_Bi |
| | 4 × 8_Bi |
| | 8 × 8_GEO_Bi |
| | 4 × 4_L0 |
| | 4 × 4_L1 |
| | 4 × 4_Bi |

In yet another embodiment of the present principles, one could group the information differently by using independent codes for the geometry-adaptive partitioning mode, and the forward/backward/bi-prediction modes (or prediction mode).

In order to have an optimal encoding of joint partition modes and prediction modes, the present principles consider an adapted mapping of the coding modes to an optimized coding word.

In an embodiment, the newly added geometric modes are interleaved with other modes of the MPEG-4 AVC Standard, as shown in TABLE 2 and TABLE 4. In another embodiment, the newly added geometric modes can be packed altogether and put in between modes of the MPEG-4 AVC Standard, as shown in TABLE 5. In another embodiment, we can pack some of the geometric modes together and interleave other geometric modes. For example, we can pack uni-prediction geometric modes together and interleave bi-predictive geometric modes with other modes of the MPEG-4 AVC Standard.

TABLE 5

| Slice Type | Mb_type | Mb_type |
|---|---|---|
| B_slice | 0 Direct | 16 8 × 16_L1L1 |
| | 1 16 × 16_L0 | 10 16 × 8_L0L1 |
| | 2 16 × 16_L1 | 11 8 × 16_L0L1 |
| | 3 16 × 16_Bi | 13 16 × 8_L1L0 |
| | 4 16 × 16_GEO_L0L0 | 14 8 × 16_L1L0 |
| | 5 16 × 16_GEO_L1L1 | 19 16 × 8_L1Bi |
| | 6 16 × 16_GEO_L1L0 | 20 8 × 16_L1Bi |
| | 7 16 × 16_GEO_L1L1 | 22 16 × 8_BiL0 |
| | 8 16 × 16_GEO_L0Bi | 23 8 × 16_BiL0 |
| | 9 16 × 16_GEO_BiL0 | 25 16 × 8_L0Bi |
| | 10 16 × 16_GEO_L1Bi | 26 8 × 16_L0Bi |
| | 11 16 × 16_GEO_BiL1 | 25 16 × 8_BiL1 |
| | 12 16 × 16_GEO_BiBi | 26 8 × 16_BiL1 |
| | 13 16 × 8_L0L0 | 25 16 × 8_BiBi |
| | 14 8 × 16_L0L0 | 26 8 × 16_BiBi |
| | 15 16 × 8_L1L1 | 31 8 × 8 Prefix |
| | | 32 Intra (4 × 4 or 16 × 16) |

Coding mode ordering for entropy coding may be dependent on the entropy coding method employed. For example, in the MPEG-4 AVC Standard, two entropy coding methods are supported: context adaptive variable length coding (CAVLC) and context adaptive binary arithmetic coding (CABAC). We can apply the same mode tables for CAVLC and CABAC, or we can apply different mode tables for CAVLC and CABAC. For example, in an embodiment, for variable length coding (VLC) coding, we can use the first embodiment above (TABLE 2 and TABLE 4). For arithmetic coding, we can use the second embodiment above (TABLE 5).

Each mode identifier is then mapped into a set of unequal length codes for entropy coding. The length of each one of the codes from the set of unequal length codes may be made dependent on the mode ordering.

Figure 6:
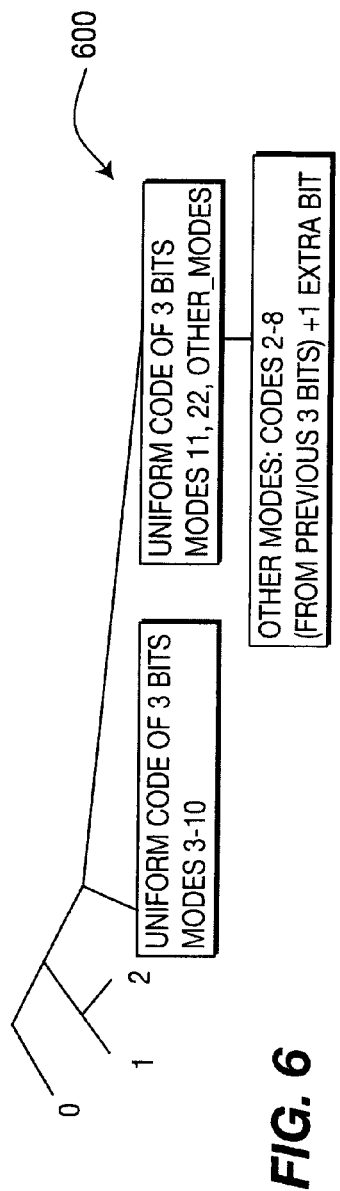
FIG. 6 is a diagram for a B-frame binary code scheme for 16×16, 16×8, 8×16, 8×8, 8×4, 4×8, 4×4, and Infra modes for context adaptive binary arithmetic coding (CABAC) in accordance with MPEG-4 AVC Standard CABAC.

Turning to FIG. 6, a B-frame binary code scheme for 16×16, 16×8, 8×16, 8×8, 8×4, 4×8, 4×4, and Intra modes for CABAC in accordance with MPEG-4 AVC Standard CABAC is indicated generally by the reference numeral 600. This is a simplified binary tree representation for each mode. The terminal nodes of the binary tree correspond to the symbol values of the mode, such that the concatenation of the binary value for traversing the tree from the root node to the corresponding terminal mode represents the bin string of the corresponding symbol value. For example, if we decide that the left leaf of the tree is 0, and that the leaf to the immediate right of the left leaf of the tree is 1, then mode 0 is represented as "0", mode 1 is represented as "100", mode 2 is represented as "101", mode 3 is represented as "110000", and so forth.

Figure 7:
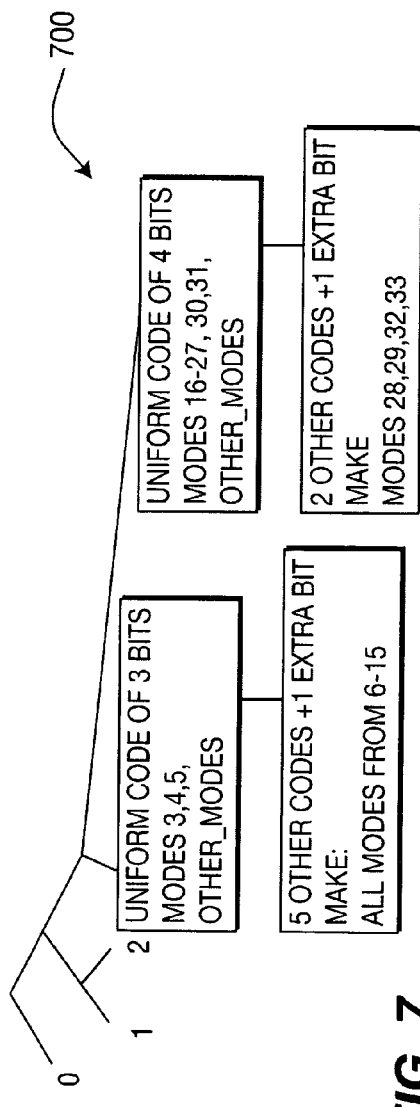
FIG. 7 is a diagram for an exemplary B-frame binary code scheme for 16×16, 16×8, 8×16, 16×16GEO, 8×8, 8×4, 4×8, 8×8GEO, 4×4, and Infra modes context adaptive binary arithmetic coding (CABAC) for an extended version of MPEG-4 AVC Standard CABAC with geometry-adaptive block partitioning on B-Frames, in accordance with an embodiment of the present principles.

Turning to FIG. 7, an exemplary B-frame binary code scheme for 16×16, 16×8, 8×16, 16×16GEO, 8×8, 8×4, 4×8, 8×8GEO, 4×4, and Intra modes CABAC for an extended version of MPEG-4 AVC Standard CABAC with geometry-adaptive block partitioning on B-Frames is indicated generally by the reference numeral 700. In this example, we add one more bit to two branches in FIG. 6, to accommodate more modes introduced by geometric B modes. It is to be appreciated that the scheme 700 may be used to generate unequal length codes from the coding mode identification number in the step of binarization previous to CABAC in the extended version of the MPEG-4 AVC Standard with geometry-adaptive block partitioning on B-Frames.

Figure 8:
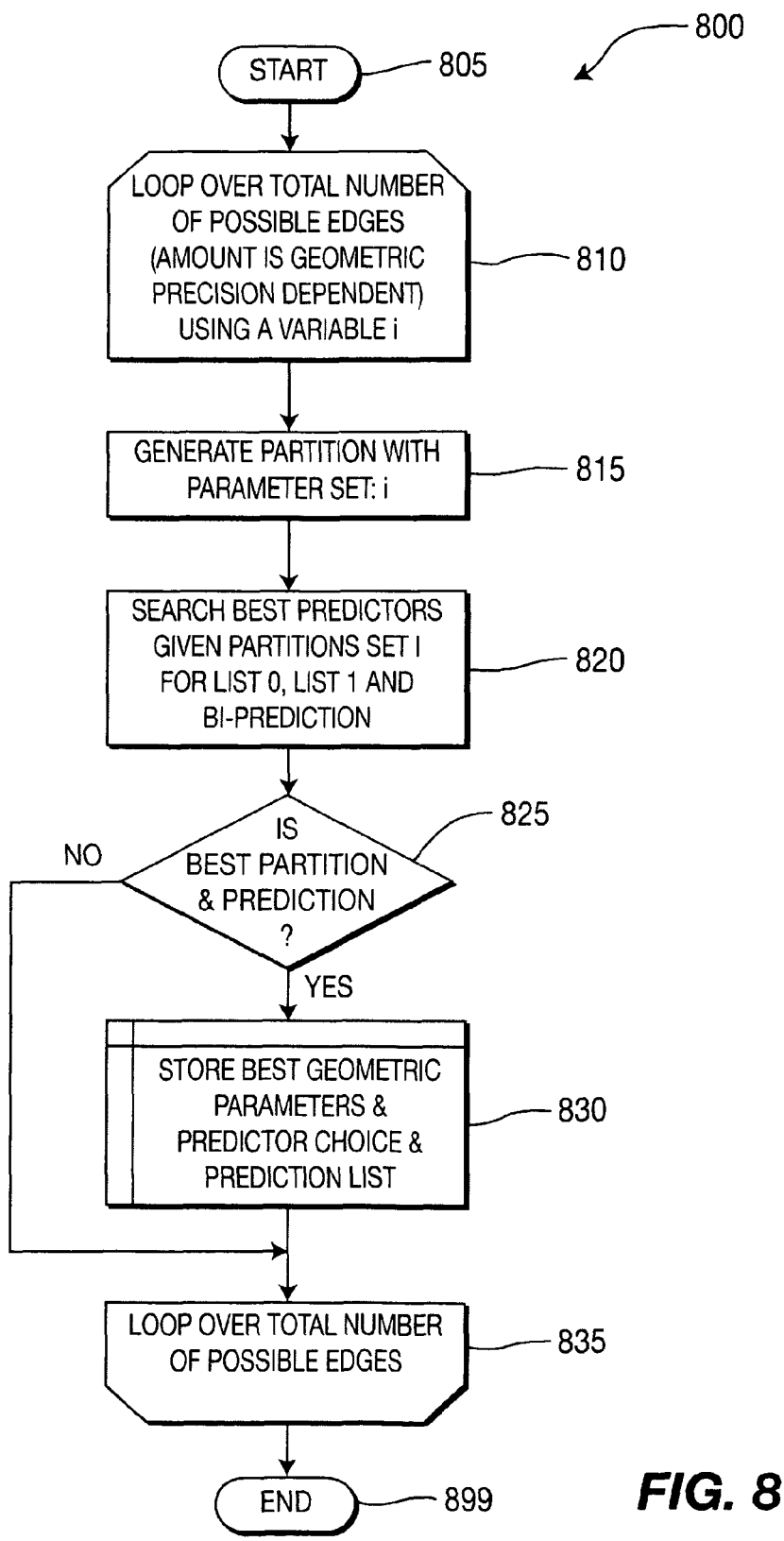
FIG. 8 is a flow diagram for an exemplary method for performing a search for a best geometric mode at an encoder, in accordance with an embodiment of the present principles.

Turning to FIG. 8, an exemplary method for performing a search for a best geometric mode at an encoder is indicted generally by the reference numeral 800.

The method 800 includes a start block 805 that passes control to a loop limit block 810. The loop limit block 810 performs a loop over the total number of possible edges (amount is geometric precision dependent) using a variable i, and passes control to a function bloc 815. The function block 815 generates a partition with a corresponding parameter set, based on a current value of the variable i, and passes control to a function block 820. The function block 820 searches for best predictors given partitions set I for list 0, list 1, and bi-prediction, and passes control to a decision block 825. The decision block 825 determines whether or not the current partition and prediction are the best partition and best prediction, respectively. If so, then control is passed to a function block 830. Otherwise, control is passed to a function block 835.

The function block 830 stores the best geometric parameters, predictor choice, and prediction list, and passes control to the function block 835.

The function block 835 ends the loop over the total number of possible edges, and passes control to an end block 899.

Figure 9:
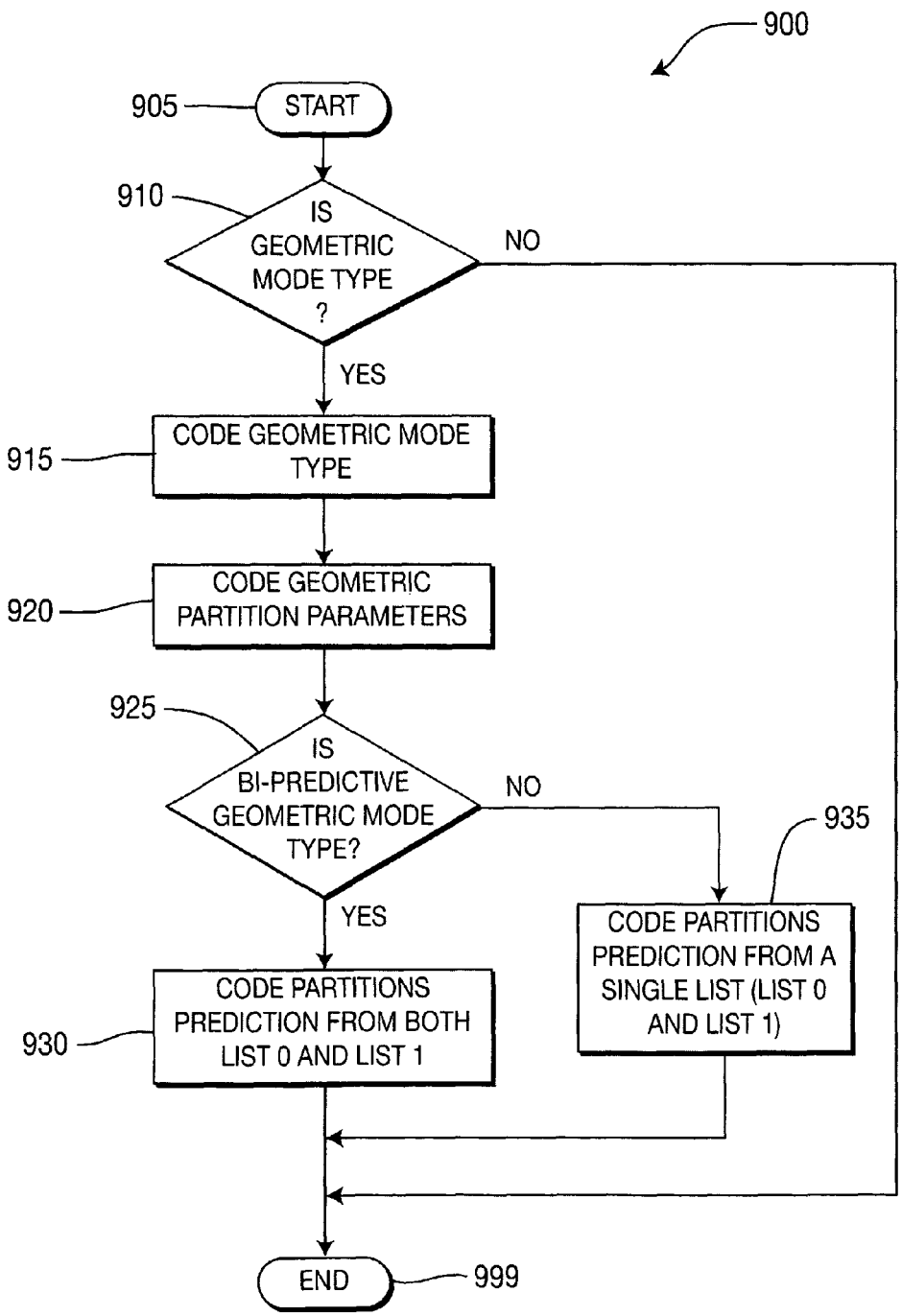
FIG. 9 is a flow diagram for an exemplary method for video encoding using geometrically partitioned bi-predictive mode partitions, in accordance with an embodiment of the present principles.

Turning to FIG. 9, an exemplary method for video encoding using geometrically partitioned bi-predictive mode partitions is indicated generally by the reference numeral 900.

The method 900 includes a start block 905 that passes control to a decision block 910. The decision block 910 determines whether or not the current type is a geometric mode type. If so, then control is passed to a function block 915. Otherwise, control is passed to an end block 999.

The function block 915 codes the geometric mode type, and passes control to a function block 920. The function block 920 codes the geometric partition parameters, and passes control to a decision block 925. The decision block 925 determines whether or not the current mode type is a bi-predictive geometric mode type. If so, then control is passed to a function block 930. Otherwise, control is passed to a function block 935.

The function block 930 codes the partitions prediction from both list 0 and list 1, and passes control to the end block 999.

The function block 935 codes the partitions prediction from a single list (list 0 or list 1), and passes control to the end block 999.

Figure 10:
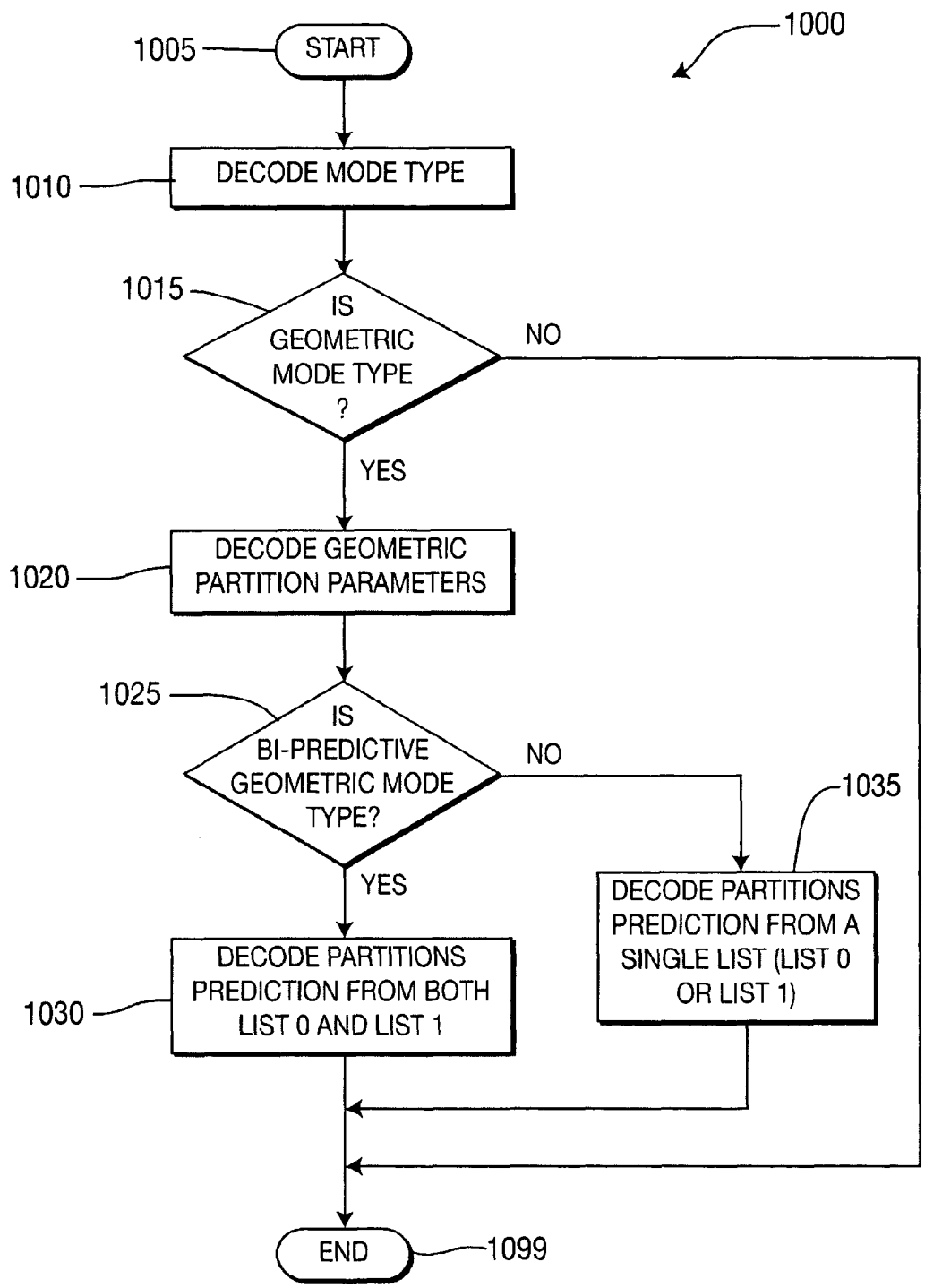
FIG. 10 is a flow diagram for an exemplary method for video decoding using geometrically partitioned bi-predictive mode partitions, in accordance with an embodiment of the present principles.

Turning to FIG. 10, an exemplary method for video decoding using geometrically partitioned bi-predictive mode partitions is indicated generally by the reference numeral 1000.

The method 1000 includes a start block 1005 that passes control to a function block 1010. The function block 1010 decodes the mode type, and passes control to a decision block 1015. The decision block 1015 determines whether or not the current mode type is a geometric mode type. If so, the control is passed to a function block 1020. Otherwise, control is passed to an end block 1099.

The function block 1020 decodes the geometric partition parameters, and passes control to a decision block 1025. The decision block 1025 determines whether or not the current mode is a bi-predictive geometric mode type. If so, then control is passed to a function block 1030. Otherwise, control is passed to a function block 1035.

The function block 1030 decodes the partitions prediction from both list 0 and list 1, and passes control to the end block 1099.

The function block 1035 decodes the partitions prediction from a single list (list 0 or list 1), and passes control to the end block 1099.

A description will now be given of some of the many attendant advantages/features of the present invention, some of which have been mentioned above. For example, one advantage/feature is an apparatus having an encoder for encoding bi-predictable picture data for at least a portion of a picture using adaptive geometric partitioning. Geometric partitions for the adaptive geometric partitioning are predicted using at least one predictor selected from a first set of predictors corresponding to a first list of references pictures, a second set of predictors corresponding to a second list of references pictures, and a third set of predictors used for bi-prediction and including predictors from at least one of the first and second sets.

Another advantage/feature is the apparatus having the encoder as described above, wherein the encoder jointly codes a block partition mode and at least one of a prediction descriptor corresponding to the first set of predictors, a prediction descriptor corresponding to the second set of predictors, and a bi-prediction prediction descriptor corresponding to the third set of predictors, using a unified codeword.

Yet another advantage/feature is the apparatus having the encoder that jointly codes as described above, wherein adaptive geometric partitioning mode codewords corresponding to geometric partition modes used with respect to the adaptive geometric partitioning have a codeword length smaller than or equal to that used for other sub-partitioned blocks.

Still another advantage/feature is the apparatus having the encoder as described above, wherein geometric modes used with respect to the adaptive geometric partitioning are at least one of interleaved with other existing modes and packed together among the other existing modes.

Moreover, another advantage/feature is the apparatus having the encoder as described above, wherein the encoder maps a mode ordering, for mode identifiers used to encode the bi-predictable picture data, into a set of unequal length codewords.

Further, another advantage/feature is the apparatus having the encoder as described above, wherein the encoder varies a geometric mode ordering for geometric mode identifiers used to encode the bi-predictable picture data depending on an entropy coding method employed.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
an encoder for encoding bi-predictable picture data for at least a portion of a picture using adaptive geometric partitioning, wherein geometric partitions for the adaptive geometric partitioning are predicted using at least one predictor selected from a first set of predictors corresponding to a first list of reference pictures, a second set of predictors corresponding to a second list of reference pictures, and a third set of predictors used for bi-prediction and including predictors from at least one of the first and second sets.

2. The apparatus of claim 1, wherein said encoder jointly codes a block partition mode and at least one of a prediction descriptor corresponding to the first set of predictors, a prediction descriptor corresponding to the second set of predictors, and a bi-prediction prediction descriptor corresponding to the third set of predictors, using a unified codeword.

3. The apparatus of claim 2, wherein adaptive geometric partitioning mode codewords corresponding to geometric partition modes used with respect to the adaptive geometric partitioning have a codeword length smaller than or equal to that used for other sub-partitioned blocks.

4. The apparatus of claim 1, wherein geometric modes used with respect to the adaptive geometric partitioning are at least one of interleaved with other existing modes and packed together among the other existing modes.

5. The apparatus of claim 1, wherein said encoder maps a mode ordering, for mode identifiers used to encode the bi-predictable picture data, into a set of unequal length codewords.

6. The apparatus of claim 1, wherein said encoder varies a geometric mode ordering for geometric mode identifiers used to encode the bi-predictable picture data depending on an entropy coding method employed.

7. A method, comprising:
encoding bi-predictable picture data for at least a portion of a picture using adaptive geometric partitioning, wherein geometric partitions for the adaptive geometric partitioning are predicted using at least one predictor selected from a first set of predictors corresponding to a first list of reference pictures, a second set of predictors corresponding to a second list of reference pictures, and a third set of predictors used for bi-prediction and including predictors from at least one of the first and second sets.

8. The method of claim 7, wherein said encoding step comprises jointly coding a block partition mode and at least one of a prediction descriptor, corresponding to the first set of predictors, a prediction descriptor corresponding to the second set of predictors, and a bi-prediction prediction descriptor corresponding to the third set of predictors, using a unified codeword.

9. The method of claim 8, wherein adaptive geometric partitioning mode codewords corresponding to geometric partition modes used with respect to the adaptive geometric partitioning have a codeword length smaller than or equal to that used for other sub-partitioned blocks.

10. The method of claim 7, wherein geometric modes used with respect to the adaptive geometric partitioning are at least one of interleaved with other existing modes and packed together among the other existing modes.

11. The method of claim 7, wherein said encoding step comprises mapping a mode ordering, for mode identifiers used to encode the bi-predictable picture data, into a set of unequal length codewords.

12. The method of claim 7, wherein said encoding step comprises varying a geometric mode ordering for geometric mode identifiers used to encode the bi-predictable picture data depending on an entropy coding method employed.

13. An apparatus, comprising:
a decoder for decoding bi-predictable picture data for at least a portion of a picture using adaptive geometric partitioning, wherein geometric partitions for the adaptive geometric partitioning are predicted using at least one predictor selected from a first set of predictors corresponding to a first list of reference pictures, a second set of predictors corresponding to a second list of reference pictures, and a third set of predictors used for bi-prediction and including predictors from at least one of the first and second sets.

14. The apparatus of claim 13, wherein said decoder decodes, from a unified codeword, a block partition mode and at least one of a prediction descriptor corresponding to the first set of predictors, a prediction descriptor corresponding to the second set of predictors, and a bi-prediction prediction descriptor corresponding to the third set of predictors.

15. The apparatus of claim 14, wherein adaptive geometric partitioning mode codewords corresponding to geometric partition modes used with respect to the adaptive geometric partitioning have a codeword length smaller than or equal to that used for other sub-partitioned blocks.

16. The apparatus of claim 13, wherein geometric modes used with respect to the adaptive geometric partitioning are at least one of interleaved with other existing modes and packed together among the other existing modes.

17. The apparatus of claim 13, wherein said decoder maps a set of unequal length codewords into a mode ordering for mode identifiers used to decode the bi-predictable picture data.

18. The apparatus of claim 13, wherein said decoder varies a geometric mode ordering for geometric mode identifiers used to decode the bi-predictable picture data depending on an entropy decoding method employed.

19. A method, comprising:
decoding bi-predictable picture data for at least a portion of a picture using adaptive geometric partitioning, wherein geometric partitions for the adaptive geometric partitioning are predicted using at least one predictor selected from a first set of predictors corresponding to a first list of reference pictures, a second set of predictors corresponding to a second list of reference pictures, and a third set of predictors used for bi-prediction and including predictors from at least one of the first and second sets.

20. The method of claim 19, wherein said decoding step comprises decoding, from a unified codeword, a block partition mode and at least one of a prediction descriptor corresponding to the first set of predictors, a prediction descriptor corresponding to the second set of predictors, and a bi-prediction prediction descriptor corresponding to the third set of predictors.

21. The method of claim 20, wherein adaptive geometric partitioning mode codewords corresponding to geometric partition modes used with respect to the adaptive geometric partitioning have a codeword length smaller than or equal to that used for other sub-partitioned blocks.

22. The method of claim 19, wherein geometric modes used with respect to the adaptive geometric partitioning are at least one of interleaved with other existing modes and packed together among the other existing modes.

23. The method of claim 19, wherein said decoding step comprises mapping a set of unequal length codewords into a mode ordering for mode identifiers used to decode the bi-predictable picture data.

24. The method of claim 19, wherein said decoding step comprises varying a geometric mode ordering for geometric mode identifiers used to decode the bi-predictable picture data depending on an entropy decoding method employed.

25. A non-transitory storage media having video signal data encoded thereupon, comprising:
   bi-predictable picture data for at least a portion of a picture encoded using adaptive geometric partitioning, wherein geometric partitions for the adaptive geometric partitioning are predicted using at least one predictor selected from a set of forward predictors, a set of backward predictors, and a set of bi-predictors.

* * * * *